United States Patent [19]
Liu

[11] Patent Number: 5,405,556
[45] Date of Patent: Apr. 11, 1995

[54] PROCESS OF FABRICATING LIGHT-FOCUSING PLASTIC OPTICAL ELEMENTS

[75] Inventor: Jui-Hsiang Liu, Tainan, Taiwan, Prov. of China

[73] Assignee: National Science Council, Taipei, Taiwan, Prov. of China

[21] Appl. No.: 47,646

[22] Filed: Apr. 13, 1993

[51] Int. Cl.⁶ .............................................. B29D 11/00
[52] U.S. Cl. ...................................... 264/1.7; 264/2.6; 264/343; 264/1.24; 427/164; 427/163.2
[58] Field of Search ................... 264/1.5, 1.7, 2.6, 343; 427/163, 164

[56] References Cited

U.S. PATENT DOCUMENTS

| | | | |
|---|---|---|---|
| 3,718,383 | 2/1973 | Moore | 264/1.7 |
| 3,816,160 | 6/1974 | Moore . | |
| 3,819,782 | 6/1974 | Irie | 264/2.6 |
| 4,022,855 | 5/1977 | Hamblen | 264/1.4 |
| 4,581,252 | 4/1986 | Guerra | 427/162 |
| 5,253,323 | 10/1993 | Koike | 264/1.5 |
| 5,258,144 | 11/1993 | Yean et al. | 264/1.7 |

FOREIGN PATENT DOCUMENTS

| | | | |
|---|---|---|---|
| 59-204519 | 11/1984 | Japan | 264/1.7 |
| 60-119510 | 6/1985 | Japan . | |
| 2-32085 | 7/1990 | Japan | 264/2.6 |

OTHER PUBLICATIONS

Yasuji Ohtsuka, et al–"Studies on the light-focusing plastic rod". Applied Optics, vol. 24, No. 24–pp. 4316–4320.

Yasuji Ohtsuka, et al–"Studies on the Light-Focusing Plastic Rod". Journal of Applied Polymer Science, vo. 26, pp. 2907–2915.

Yasuji Ohtsuka, et al–"Studies on the light-focusing plastic rod". Applied Optics, vol. 20, No. 13–pp. 2319–2323.

Yasuji Ohtsuka, et al–"Studies on the light-focusing plastic rod". Applied Optics, vol. 22, No. 3–pp. 413–417.

Yasuhiro Koike, et al–"Studies on the light-focusing plastic rod". Applied Optics, vol. 22, No. 3–pp. 418–423.

Yasuhiro Koike, et al–"New interfacial-gel copolymerization technique . . . " Applied Optics, vol. 27, No. 3–pp. 486–491.

*Primary Examiner*—Mathieu Vargot
*Attorney, Agent, or Firm*—Ladas & Parry

[57] ABSTRACT

A process of fabricating a light-focusing plastic optical element includes preparing a prepolymer transparent preform. The prepolymer preform is immersed in a solution containing more than one monomer, each of the monomers having a different reactivity ratio from the other. Some of the monomers may permeate into and disperse in the preform so as to swell the prepolymer preform. The monomers dispersed in the preform are copolymerized after the preform is swelled completely to produce a plastic optical element.

9 Claims, 6 Drawing Sheets

PROCESS OF FABRICATING LIGHT-FOCUSING PLASTIC OPTICAL ELEMENTS

BACKGROUND OF THE INVENTION

The present invention relates to a process of fabricating light-focusing plastic optical elements, and in particular to a process of fabricating a light-focusing plastic rod (LFPR) having a large diameter and superior imaging properties.

Light-focusing rods (LFR) are a type of gradient index (GRIN) optical element. The refractive-index distribution of a LFR is parabolic from its central axis to the periphery. Because of such property, the incident light will travel in a zigzag way through the rod and focus at the outer space behind its exiting end. This fact makes the LFR act as a concave lens and thus it is commonly called a "light focusing rod".

Among optical elements, there are three types which have the above-mentioned parabolic refractive index distribution and are cylindrical in shape. They are GI type optical fiber, GRIN rod, and Wood lens. Their image-transporting principles are the same, but lengths and application categories differ. Among them, GI type optical fiber (e.g. silica series fibers) is the longest one, usually longer than several hundred meters or even up to tens of kilometers, and is used as a transmitting medium in optical communication systems. GRIN rod has a medium length and can be used as an element of a image-transport system, optical fiber connection device, and detective sensors. In general, those having a length longer than the internal diameter but not being used as optical fiber are classfied as GRIN rod. Whereas Wood lens is in the form of a thin lens with a length shorter than its internal diameter and is used mainly in image-transport and light focusing.

There are up to now many reports and patents concerning the fabrication of LFPR. For example, U.S. Pat. No. 3,718,383 (1973), No. 3,861,160 (1974), and No. 4,581,252 (1986) disclose a non-solvent swelling diffusion method, which method comprises diffusing a variety of monomers to a plastic rod by using a mixture of non-solvent and solvent, and polymerizing these monomers to cause a specific refractive-index distribution. Such method takes advantage of the diffusion gradient of the monomers and thus produces a parabolic distribution of the refractive index. Furthermore, Ohtsuka discloses a UV-induced copolymerization method wherein the supplementation of the monomer solution is controlled to avoid bubble formation caused by the shrinkage of the polymerization [Y. Ohtsuka, Appl. Opt., Vol.24, No.24 (1985), 4316]. In addition, Ohtsuka's group also invented a two-step copolymerization process to fabricate light-focusing plastic rods. For example, the vapor-phase transfer process [Y. Ohtsuka, Appl. Opt., Vol 22, No. 3 (1983), 413], comprises preparing a partially polymerized gel rod, placing the gel rod in the atmosphere of trifluoroethyl methacrylate vapor, followed by heat treatment to yield the GRIN rod. The process disclosed in J. Appl. Polym. Sci., (Vol. 26, (1981), 2907-2915) comprises immersing a partially polymerized gel rod in 2,2,3,3,-tetrafluoropropyl methacrylate, followed by heat treatment under nitrogen. The process disclosed in Appl. Opt., (Vol. 20, No. 13, (1981), 2319) is also a two-step copolymerization process, which comprises polymerizing diethylene glycol bisallyl carbonate to form a partially polymerized gel rod, then immersing the gel rod in fluoroethyl methacrylate under nitrogen. All of the light-focusing plastic rods obtained by the two-step copolymerization process invented by Ohtsuka et al have a crosslinked structure and therefore can not be further fabricated into optical fibers. An interfacial-gel copolymerization technique is also reported by Ohtsuka (Appl. Opt. Vol. 27, No. 3, 486). By this technique, a copolymer phase gradually forms from the gel phase formed at the interface between the monomer and polymer substrate, and a gradient-index profile is thus obtained from the gel phase formed on the wall of the polymer substrate. Furthermore, U.S. Pat. No. 4,022,855 (1977) and JP 60-119510 (1985) disclose a centrifugal casting method to fabricate preform of plastic optical fibers.

All of the above-mentioned processes take different approaches to fabricate LFR having a parabolic refractive-index distribution and avoid shrinkage of the rod. However, they all need complicated procedures and equipments. For example, in the UV-induced copolymerization method, apparatus capable of producing UV light is required. Besides, in order to avoid the shrinkage of the fabricated LFR, the diameter of the plastic rod produced by the above-mentioned processes is limited and thus the portion that can be used for image transfer is relative small and sometimes will causes distortion of the image transfered.

SUMMARY OF THE INVENTION

It is therefore an object of the present invention to provide a simpler process for the fabrication of light-focusing plastic optical elements.

Another object of the present invention is to provide a process of fabricating a light focusing plastic rod having large diameter and superior imaging properties.

To attain the above objects, the process of the present invention includes: a) preparing a prepolymer transparent preform; b) immersing the prepolymer preform in a solution containing more than one monomers, each of the monomers having a different reactivity ratio from the others, to allow a part of the monomers to permeate into and disperse in the preform so as to swell the prepolymer preform; c) copolymerizing the monomers dispersed in the preform after the preform is swelled completely to produce a plastic article; and d) optionally, fabricating the plastic article into the optical elements.

According to an aspect of the present invention, the prepolymer can be a linear polymer, and therefore the plastic article produced can be further fabricated into optical fibers.

According to another aspect of the present invention, due to the gel effect and different reactivity ratio of each monomer, after the prepolymer preform is swelled completely and has become homogeneous, the monomers having larger reactivity ratio will be polymerized or copolymerized first, and in a faster manner in the swollen zone of the preform than outside of the swollen zone, and also be consumed more rapidly. This causes the monomers having larger reactivity outside of the swollen zone to be supplemented into the swollen zone continuously. This mechanism permits polymerization to proceed from the center of the preform toward its periphery, which is opposite to the process of Ohtsuka, and therefore a parabolic refractive-index profile from the center to the periphery is formed, and a plastic optical element having larger transporting area and superior imaging properties can be obtained.

BRIEF DESCRIPTION OF THE DRAWINGS

The present invention can be fully understood by a reading to the subsequent detailed description of the preferred embodiment and examples, with references to the accompanying drawings, wherein.

DETAILED DESCRIPTION OF THE INVENTION

According to the process of the present invention, the prepolymer should have good transparency and can be a linear prepolymer or a crosslinked prepolymer. For example, PMMA (poly methyl methacrylate), PEGDMA (Poly Ethylene Glycol Dimeth Acrylate), PSt (polystyrene), and PVB (poly vinyl benzoate) are suitable for use as the prepolymer of the present process. If optical fibers are desired, naturally a prepolymer having linear structure( such as poly methyl methacrylate) must be selected as the preform material.

The shape of the prepolymer preform can be rod, plate, or sphere. It is preferable that the preform is in the shape of a rod when it is to be further fabricated into optical fibers. The fabricating method of the prepolymer preform can be, for example, the injection molding method, the casting method, but is not limited to these two methods alone.

The monomers of the solution used for the immersion should have different reactivity ratios, and preferably have very close density and solubility parameter. If a two-component monomers system is used, preferably, one monomer should have a reactivity ratio $>1$ and the other should have a reactivity ratio $<1$. The weight ratio of the monomers used should be in a determined range. However, different weight ratios are used for different monomers.

PREFERRED EMBODIMENT OF THE PRESENT INVENTION

A preferred embodiment for carrying out the process of the present invention is described below. In this embodiment, a poly methyl methacrylate (PMMA) rod is used as the prepolymer preform, a solution containing only methyl methacrylate (MMA) and vinyl benzoate (VB) as monomers is used for immersing the prepolymer preform.

Figure 1A:
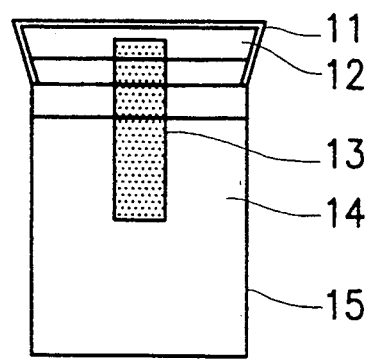
FIG. 1A illustrates the immersion procedure of a prepolymer rod in a solution of comonomers.

Referring to FIG. 1A, a PMMA prepolymer rod 13 is immersed in a mixture 14 of comonomers (MMA/VB=4/1; weight ratio) and AIBN ($\alpha,\alpha'$-azobisisobutyronitrile, at a concentration of 1%) as initiator. All of them are placed in a glass tube 15 which is capped by a silicone stopper 12 and sealed with tape 11.

Figure 1B:
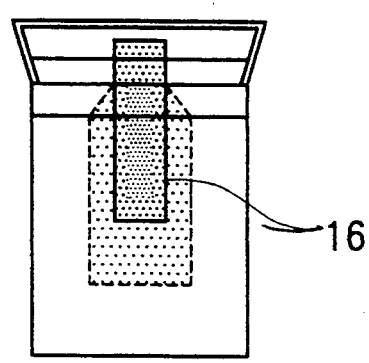
FIG. 1B illustrates the swelling procedure of the prepolymer rod in the solution containing comonomers and AIBN at swelling temperature.
Figure 1C:
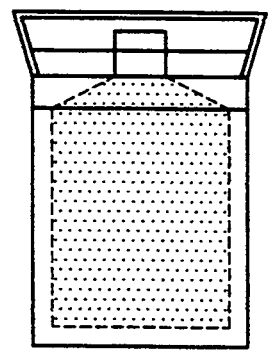
FIG. 1C illustrates the copolymerization procedure at polymerising temperature.
Figure 1D:
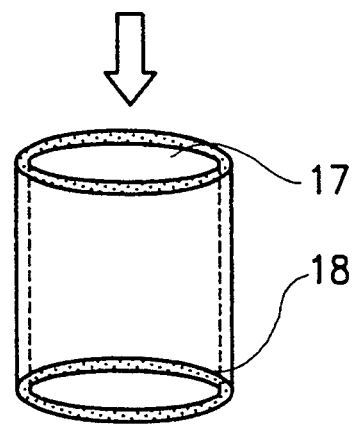
FIG. 1D illustrates the obtained LFPR after polishing the end faces.

During the swelling procedure as shown in FIG. 1B, which proceeds at a swelling temperature ($T_1$), the PMMA rod 13 gradually disappears and the swelling gel 16 increases. When the PMMA rod 13 has fully disappeared and the swelling gel 16 has increased to the maximum, the temperature is raised to a polymerizing temperature ($T_2$) for full copolymerization (FIG. 1C). The LFPR obtained (FIG. 1D) after cutting off two ends and polishing the end faces, consists of dull area 18 and transparent area 17 with a gradient-index distribution.

The LFPR prepared according to the above preferred embodiment has a large area for image-transporting, i.e., high ratio of Rc/Rp ($>90\%$), wherein Rc is the active radius of LFPR, in which the refractive index exhibits a guadratic curve distribution, and Rp is the radius of LEPR) and low A value (refractive index distribution constant). Accordingly, the image transported will not be distorted.

The process of the invention will be further illustrated but not restricted by the examples below.

EXAMPLE 1

A mixture of MMA monomers (Merck Co., West Germany; EP grade) and 0.2 wt. % of AIBN (Hanawa Co., Japan; EP grade) was placed in a glass tube (4 mm ID) which was then heated in a water bath at 42° C. for 20 hours. The resultant PMMA prepolymer rod was removed and placed in another glass tube (14 mm ID) containing a mixture of comonomers [MMA/VB (Tokyo Kase Co., Japan; R grade)=4/1] and initiator AIBN (0.05 wt. %), heated at 36° C. for about 10 hours to swell the PMMA rod and followed by raising the temperature to 60° C. for full polymerization. The resultant plastic rod was taken out, cut off at an appropriate length and polished at the end faces to provide a LFPR. The optical properties of the LFPR are shown in Table 1.

EXAMPLE 2

Same procedure as described in Example 1 was used, except that the concentration of AIBN was changed to 0.075 wt. %. The optical properties of the LFPR thus prepared are listed in Table 1.

EXAMPLE 3

Same procedure as described in Example 1 was used, except that the concentration of AIBN was changed to 0.1 wt. %. The optical properties of the LFPR thus prepared are listed in Table 1.

TABLE 1

| $T_1 = 36°$ C. | $T_2 = 60°$ C. | MMA/VB | = 4/1 |
|---|---|---|---|
| I (wt %) | 0.05 | 0.075 | 0.1 |
| $N_A$ | 0.104 | 0.108 | 0.098 |
| $2\Theta_{max}(°)$ | 11.97 | 12.43 | 11.41 |
| A ($\times 10^{-3}$) | 4.426 | 4.073 | 4.22 |

TABLE 1-continued

| $T_1 = 36°$ C. | $T_2 = 60°$ C. | MMA/VB = 4/1 |
|---|---|---|
| Rc/Rp (%)   94 | 93 | 90 |

I is the concentration of initiator (AIBN), by weight %
*$N_A$: numerical aperture $$NA = \sin\theta_{max} = \sqrt{n_1^2 - n_2^2} = \sqrt{2\Delta} \cdot n_1$$

$$\Delta = \frac{n_1^2 - n_2^2}{2n_1^2} = \frac{n_1 - n_2}{n_1}$$

Wherein
$n_1$ is refractive index of the core
$n_2$ is refractive index of the cladding $$2\theta_{max} = 2\sin^{-1}(NA) = 2\sin^{-1}\sqrt{n_1^2 - n_a^2}$$

*2θmax: maximum acceptance angle

Figure 6:
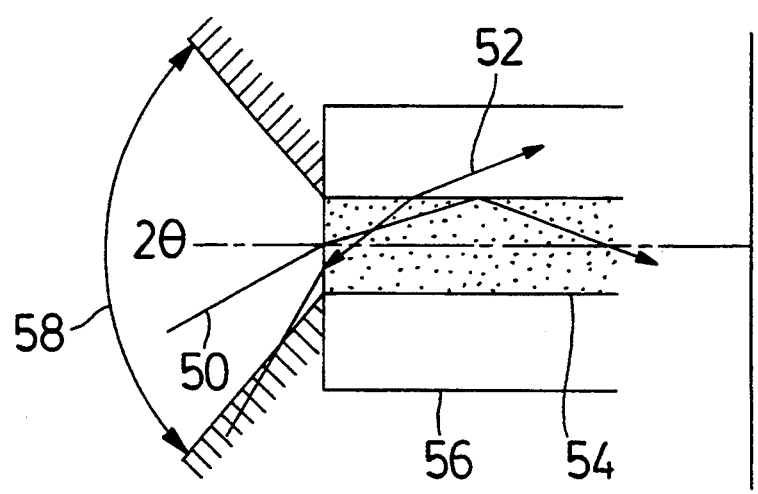
FIG. 6 illustrates the meaning of maximum acceptance angle of a SI type optical fiber.

FIG. 6 illustrates the meaning of maximum acceptance angle of a SI type optical fiber. Light beams 50 and 52 penetrate core 54 encompassed by cladding 56. Maximum acceptance angle 58 is 28 max.

A is refractive index distribution constant

As shown in Table 1, the values of Rc/Rp are higher than 90%, demonstrating that the LFPRs fabricated by the present invention have superior image-transporting properties. Furthermore, it also shows that concentrations of the initiator will not affect the optical properties of the LFPRs.

Figure 2:
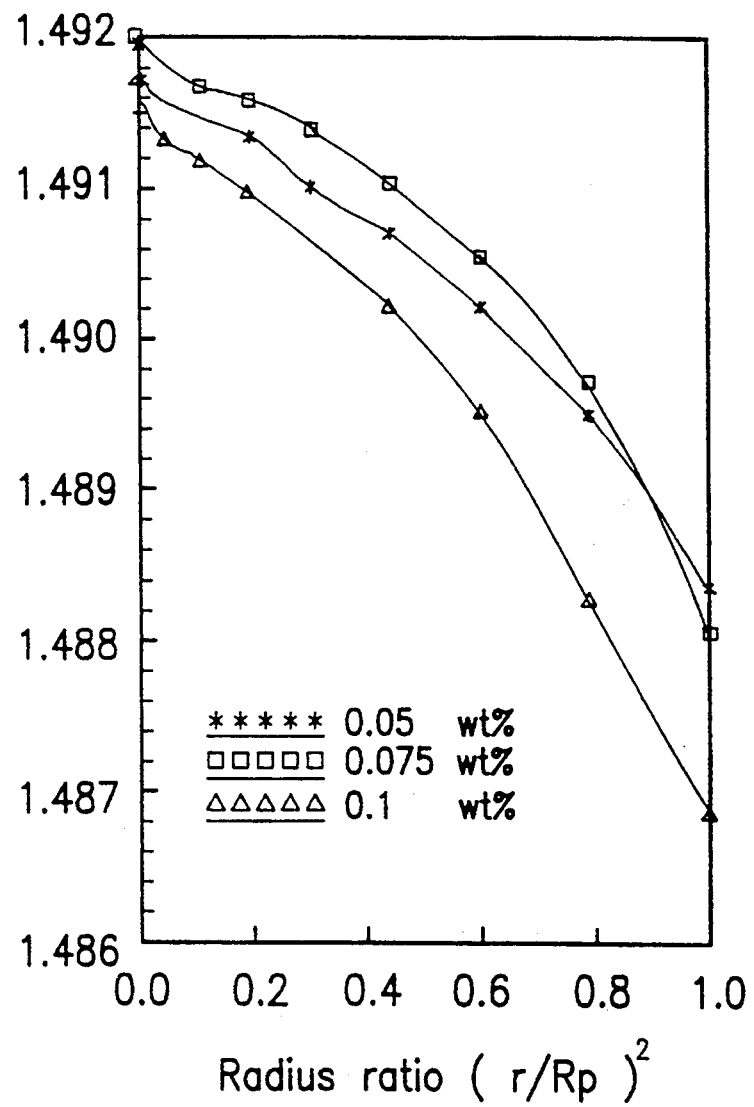
FIG. 2 shows the dependence of refractive index on $(r/Rp)^2$ with various AIBN concentrations of the LFPRs obtained by Examples 1-3.
Figure 3:
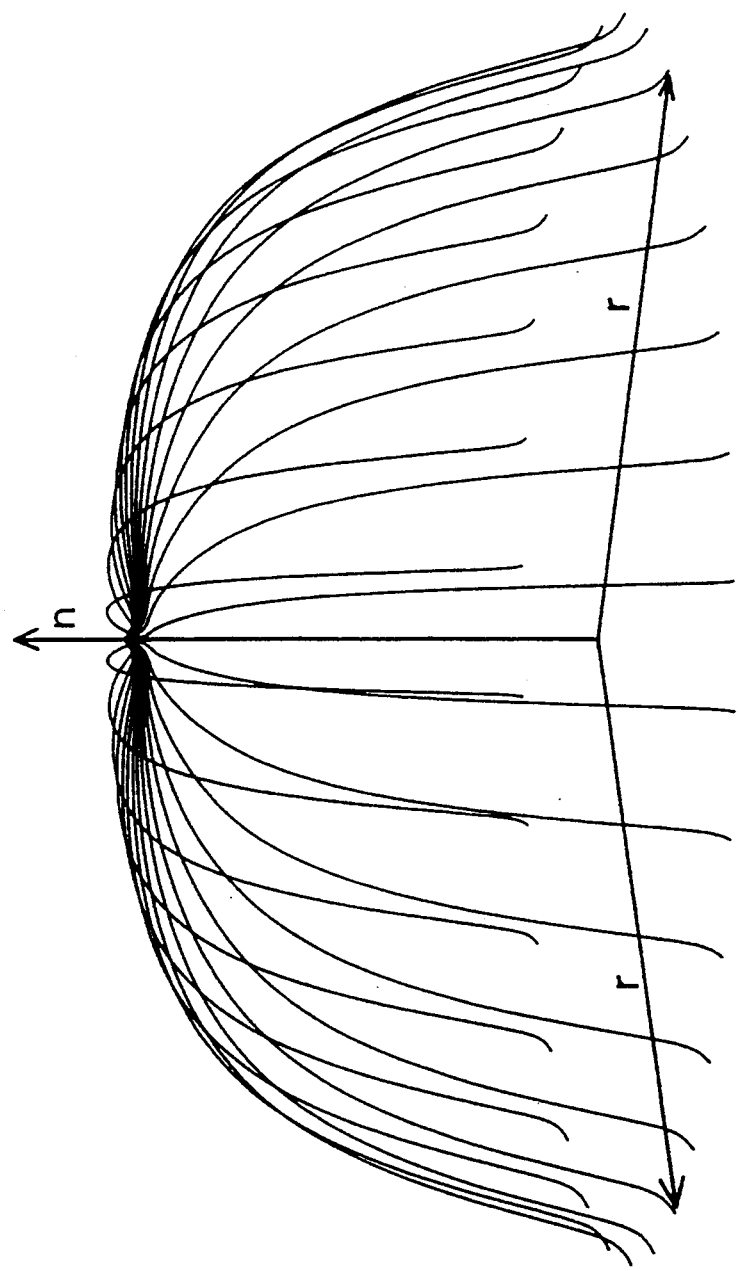
FIG. 3 shows the 3-dimensional refractive-index distribution of the LFPR prepared in Example 3.

The refractive-index distribution of the LFPRs of the above three examples is shown in FIG. 2. As shown in FIG. 2, the index distribution is almost parabolic from their center axix to the periphery. FIG. 3 shows the 3-dimensional refractive-index distribution of the LFPR prepared in Example 3.

EXAMPLE 4

A mixture of MMA monomers (Merck Co., West Germany; EP grade) and 0.2 wt. % of AIBN (Hanawa Co., Japan; EP grade) was placed in a glass tube (4 mm ID) which was then heated in a water bath at 42° C. for 20 hours. The resultant PMMA prepolymer rod was removed and placed in another glass tube (14 mm ID) containing a mixture of comonomers [MMA/VB (Tokyo Kase Co., Japan; R grade)=4/1] and initiator AIBN (0,075 wt. %), and heated at 36° C. for about 10 hours to swell the PMMA rod and followed by raising the temperature to 57.5° C. for full polymerization. The resultant plastic rod was taken out, cut off at an appropriate length and polished at the end faces to provide a LFPR. The optical properties of the LFPR are shown in Table 2.

EXAMPLE 5

Same procedure as described in Example 4 was used, except that the swelling temperature ($T_1$) was changed to 40° C. The optical properties of the LFPR thus prepared are listed in Table 2.

EXAMPLE 6

Same procedure as described in Example 4 was used, except that $T_1$ was changed to 44° C. The optical properties of the LFPR thus prepared are listed in Table 2.

TABLE 2

| I = 0.075 wt % $T_2$ = 57.5° C. MMA/VB = 4/1 | | | |
|---|---|---|---|
| $T_1$ (°C.) | 36 | 40 | 44 |
| $N_A$ | 0.085 | 0.102 | 0.087 |
| $2\Theta_{max}$ (°) | 9.88 | 11.75 | 9.96 |
| A ($\times 10^{-3}$) | 3.497 | 4.413 | 3.44 |
| Rc/Rp (%) | 97 | 96 | 99 |

As shown in Table 2, the values of Rc/Rp are higher than 96%, demonstrating that the provided LFPRs fabricated by the present invention have superior image-transporting properties. Furthermore, it shows that the swelling temperature will not affect the optical properties of the LFPRs.

EXAMPLE 7

A mixture of MMA monomers (Merck Co., West Germany; EP grade) and 0.2 wt. % of AIBN (Hanawa Co., Japan; EP grade) was placed in a glass tube (4 mm ID) which was then heated in a water bath at 42° C. for 20 hours. The resultant PMMA prepolymer rod was removed and placed in another glass tube (14 mm ID) containing a mixture of comonomers [MMA/VB (Tokyo Kase Co., Japan; R grade)=4/1] and initiator AIBN (0.05 wt. %), and heated at 40° C. for about 10 hours to swell the PMMA rod and followed by raising the temperature to 57.5° C. for full polymerization. The resultant plastic rod was taken out, cut off at an appropriate length and polished at the end faces to provide a LFPR. The optical properties of the LFPR are shown in Table 3.

EXAMPLE 8

Same procedure as described in Example 7 was used, except that the polymerization temperature ($T_2$) was changed to 60° C. The optical properties of the LFPR thus prepared are listed in Table 3.

EXAMPLE 9

Same procedure as described in Example 7 was used, except that $T_2$ was changed to 62.5° C. The optical properties of the LFPR thus prepared are listed in Table 3.

EXAMPLE 10

Same procedure as described in Example 7 was used, except that $T_2$ was changed to 65° C. The optical properties of the LFPR thus prepared are listed in Table 3.

TABLE 3

| I = 0.05 wt % $T_1$ = 40° C. MMA/VB = 4/1 | | | | |
|---|---|---|---|---|
| $T_2$ (°C.) | 57.5 | 60 | 62.5 | 65 |
| $N_A$ | 0.099 | 0.089 | 0.097 | 0.103 |
| $2\Theta_{max}$ (°) | 11.42 | 10.12 | 11.11 | 11.86 |
| A ($\times 10^{-3}$) | 4.187 | 3.752 | 3.986 | 3.919 |
| Rc/Rp (%) | 97 | 99 | 99 | 97 |

As shown in Table 3, the value of Rc/Rp are higher than 97%, demonstrating that the LFPRs fabricated by the present invention have superior image-transporting properties. Furthermore, it shows that the polymerization temperature will not affect the optical properties of the LFPRs.

EXAMPLE 11

Figure 4:
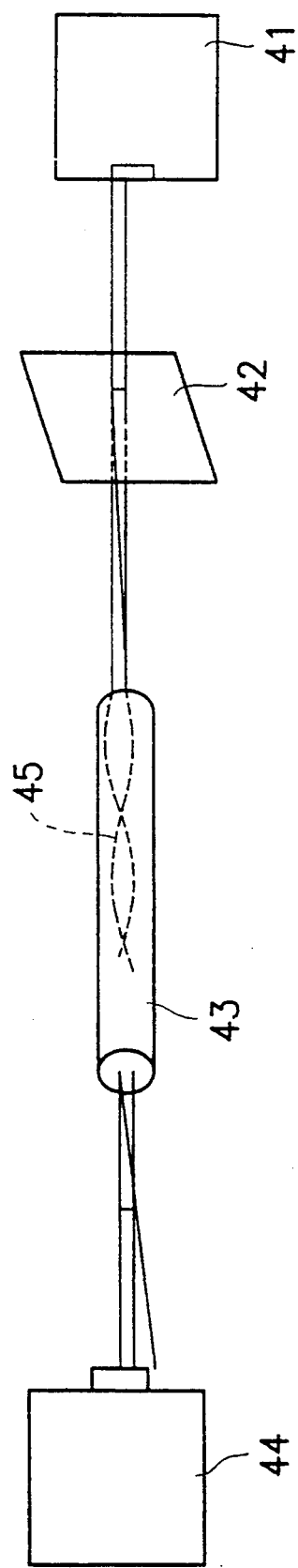
FIG. 4 is a schematic view of the device used for testing the image transported through LFPR.
Figure 5A:
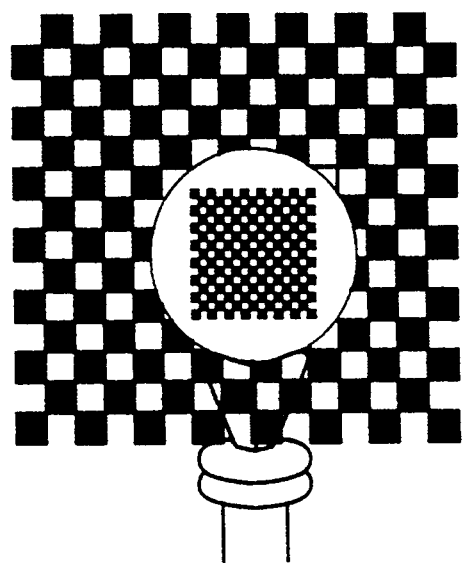
FIG. 5A shows the image transported by a LFPR fabricated by the present invention.

The image-transporting properties of the LFPR fabricated by Example 1 was further tested in this Example by using a device as shown in FIG. 4, in which 44 is a camera, 43 is a LFPR, 45 indicates light rays, 42 is a slide, and 41 is light source. When an object is mounted on the slide 42, its image will be taken by camera 44. FIG. 5A shows the image of a 7-mm square checkered pattern through a LFPR having a length of 29 mm and a diameter of 9 mm. As shown in FIG. 5A, the LFPR of the present invention has superior imaging properties and the image transfered will not be distorted.

COMPARATIVE EXAMPLE

Figure 5B:
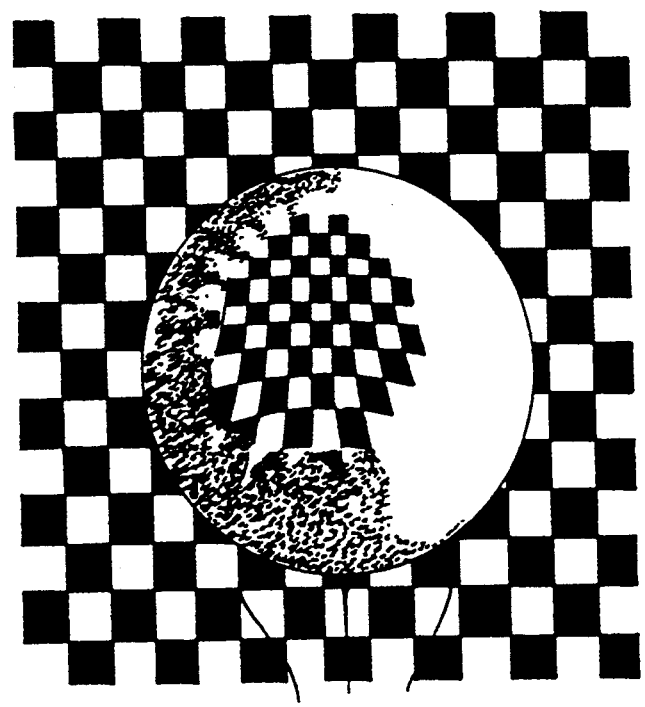
FIG. 5B shows the image transported by a LFPR fabricated by the UV-induced copolymerization method.

In this comparative Example, a LFPR fabricated by a UV-induced copolymerization method was obtained and tested using the same device as set forth in Example 11. The image is shown in FIG. 5B.

What is claimed is:

1. A process of fabricating a light-focusing plastic optical element, which comprises the following steps:
   a) preparing a prepolymer transparent preform;
   b) immersing the prepolymer preform in a solution containing more than one monomer, each of the monomers having a different reactivity ratio from the other, to allow a part of the monomers to permeate into and disperse in the preform so as to swell the prepolymer preform; and
   c) copolymerizing the monomers dispersed in the preform after the preform is swelled completely to produce a plastic optical element.

2. The process of claim 1, wherein said prepolymer is a linear polymer.

3. The process of claim 2, wherein the linear polymer is poly methyl methacrylate.

4. The process of claim 3, wherein the monomers are methyl methacrylate and vinyl benzoate with a weight ratio of 4:1.

5. The process of claim 1, wherein the preform is in the shape of a rod.

6. The process of claim 1, wherein the perform is in the shape of a sphere.

7. The process of claim 1, wherein the solubility parameter of each monomer is near that of the other monomers.

8. The process of claim 1, wherein the preform is fabricated by injection molding.

9. The process of claim 1, wherein the propolymer is a crosslinking prepolymer.

* * * * *